United States Patent [19]

Grawey

[11] 3,999,585
[45] Dec. 28, 1976

[54] PNEUMATIC TIRE HAVING BREAKER STRUCTURE

[75] Inventor: Charles E. Grawey, Peoria, Ill.
[73] Assignee: Caterpillar Tractor Co., Peoria, Ill.
[22] Filed: July 14, 1975
[21] Appl. No.: 595,903

Related U.S. Application Data

[63] Continuation-in-part of Ser. No. 572,364, April 28, 1975, abandoned.

[52] U.S. Cl. .......................... 152/361 R; 152/354; 152/361 DM
[51] Int. Cl.² ...................... B60C 9/20; B60C 9/02
[58] Field of Search ... 152/361 R, 361 DM, 361 FP, 152/354, 355, 357

[56] References Cited
UNITED STATES PATENTS

| 2,930,426 | 3/1960 | Klang et al. | 152/361 R |
| 3,335,777 | 8/1967 | Hutch | 152/361 R |
| 3,533,898 | 10/1970 | Bezbatchenko, Jr. | 152/361 R |
| 3,606,921 | 9/1971 | Grawey | 152/361 R |
| 3,703,202 | 11/1972 | Maiocchi | 152/361 R |
| 3,786,851 | 1/1974 | Mirtain et al. | 152/361 DM |
| 3,850,219 | 11/1974 | Snyder | 152/361 DM |

Primary Examiner—Drayton E. Hoffman
Attorney, Agent, or Firm—Eugene C. Goodale

[57] ABSTRACT

In a pneumatic tire of the type manufactured with the carcass in the final formed condition of a preselected configuration, the tire is provided with a plurality of breaker plies which are positioned radially from the circumferential cord belt. The breaker plies are applied to the tire in the formed condition thereby eliminating any "pantographing" of the breaker plies. Each breaker ply is positioned so that the reinforcing material thereof is disposed at an angle to the vertical plane of the tire. A radial reinforcing means is placed about the carcass to prevent cross-sectional circumferential expansion of the tire upon pressurization.

7 Claims, 11 Drawing Figures

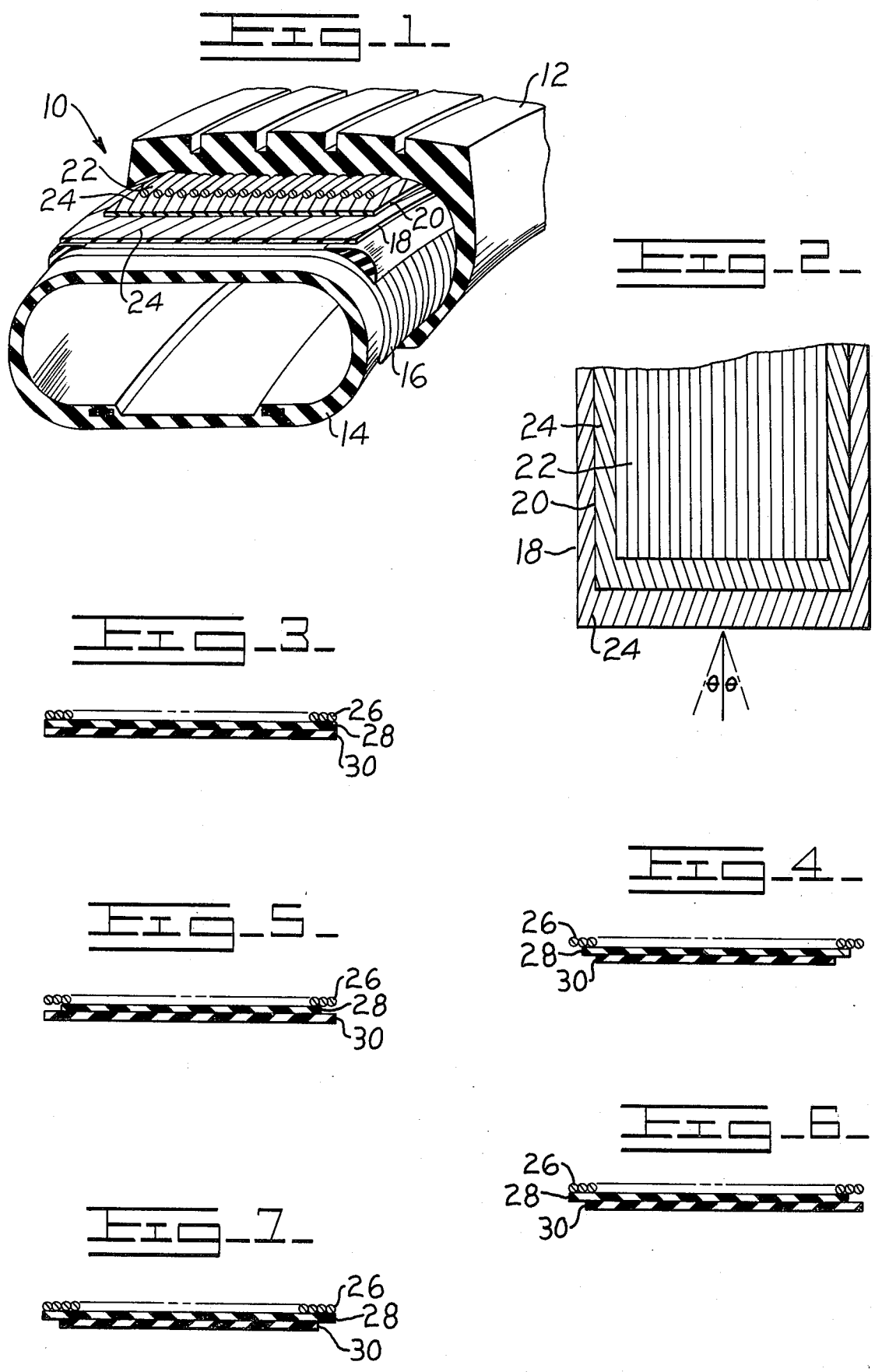

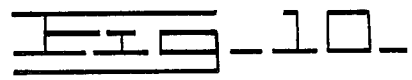
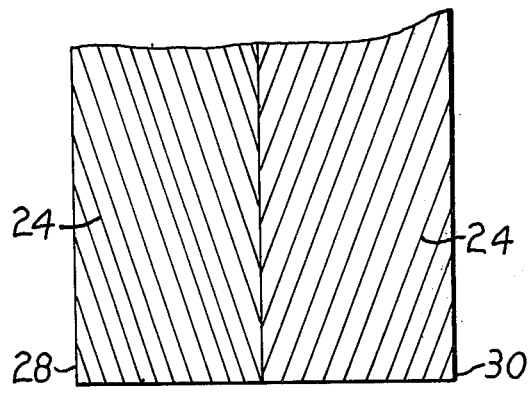
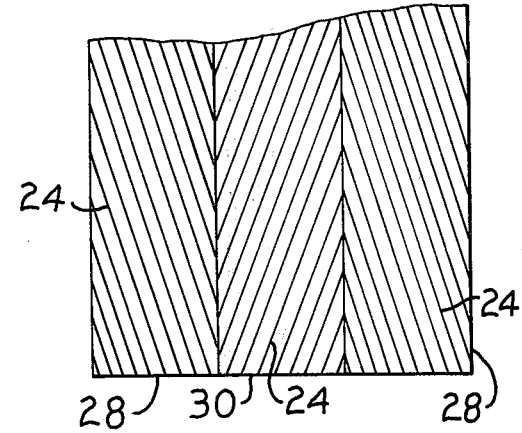

PNEUMATIC TIRE HAVING BREAKER STRUCTURE

This application is a Continuation-in-Part application of my prior application, Ser. No. 572,364, filed Apr. 28, 1975, now abandoned.

BACKGROUND OF THE INVENTION

This invention relates generally to pneumatic tires and more particularly to such a tire having improved lateral beam stiffness of the tread due to the breaker structure therein.

In the manufacture of pneumatic tires, it is known to provide such tires with one or more layers of material between the carcass and the tread to stiffen the tread. Such layers are known generally as breaker plies and will be referred herein as breakers. The breakers themselves may be formed of any suitable reinforcing material held in place by an elastomer.

The purpose of the respective breakers is to stiffen the tread such that a more uniform "footprint" is presented between the tire and the ground. The breakers also provide more rigidity in the horizontal plane of the footprint. While all the factors contributing to "squirm" are not known, it is known that squirm of the tread within the footprint seriously decreases tread life and may cause additional heat to be generated within the tire structure. In addition, lateral forces imparted to the tire structure during turning movements will also cause a squirm effect in the footprint. The breakers are a method of construction which tends to lessen the effect of squirm.

In the manufacture of a tire, the breakers are positioned on the carcass so that the principal reinforcing fibers are at an angle with respect to the mid-circumferential plane of the tire band. In the conventional open-center toroidal tire the initial angle will change to some other angle in the completed tire since the flat tire band must "grow" in the press and vulcanizing mold to its final open-center toroidal shape. While the breaker reinforcing fibers or the like may be parallel when applied to the tire band, as the band is formed into the conventional tire shape, such parallel fibers will pantograph due to the tire molding process.

It has also been noted that tires having been manufactured with various plies or breakers inherently have a degree of "ply steer". Ply steer is the tendency of the tire to steer in the direction of the last applied bias belt. The amount of ply steer depends on the reinforcing material used in the ply as well as the angle at which the ply is applied to the tire relative the mid-circumferential plane.

Breaker plies heretofore in use have been substantial in weight and construction. The breakers must resist hoop forces from the inflation of the tire as well as centrifugal forces imparted thereto when the tire is in use, often at substantially high speeds.

Accordingly, it is an object of this invention to provide a pneumatic tire having a breaker structure to provide increased stiffness in the tread and rigidity in the horizontal plane of the footprint of the tire during application of turning forces to the tire.

Another object of this invention is to provide a pneumatic tire in which the breaker structure has a uniform placement of the reinforcing material from side to side.

A still further object of this invention is to provide a pneumatic tire having a breaker structure in which the reinforcing fibers of a given direction in the breaker ply are all at substantially the same angle throughout the footprint.

And yet another object of this invention is to provide a pneumatic tire in which ply steer is substantially eliminated through the use of a circumferential belt.

And yet a still further object of this invention is to provide a pneumatic tire having a breaker structure in which the breaker structure can be very light without decreasing the enhanced beam stiffness.

SUMMARY OF THE INVENTION

This invention provides an improved pneumatic tire having a breaker structure therein to add increased stiffness to the tread and rigidity in the horizontal plane of the footprint. The breaker plies are positioned radially from the circumferential reinforcing belt. The breaker plies are placed on the green carcass in the tire's finished dimensional configuration such that the reinforcing material of the breaker plies is at the same angle throughout the footprint of the tire. Each breaker ply is placed such that the reinforcing material is at an angle to the tire meridian, each breaker ply being placed such that the angle is equal but opposite to the previous breaker.

Other objects, details, uses and advantages of this invention will become apparent as the following description of the exemplary embodiments thereof presented in the accompanying drawings proceeds.

BRIEF DESCRIPTION OF THE DRAWINGS

The accompanying drawings show present exemplary embodiments of this invention in which:

FIG. 1 is a perspective of a broken-away portion of the pneumatic tire of this invention showing the relative placement of the breaker structure;

FIG. 2 shows diagrammatically in plan view the breaker structure of the tire illustrated in FIG. 1; and FIGS. 3–11 are diagrammatic illustrations of other breaker configurations.

DESCRIPTION OF ILLUSTRATED EMBODIMENTS

Reference is now made to FIG. 1 of the drawings, which illustrates one exemplary embodiment of the improved pneumatic tire of this invention, which is designated generally by the reference numeral 10. The tire 10 is of the closed tube type tire more fully described in U.S. Pat. Nos. 3,606,921 and 3,776,792, each issued in the name of C. E. Grawey and assigned to Caterpillar Tractor Co., the assignee of the present application. The general configuration of the 10 tire and method of manufacturing the same are more fully described in the aforementioned patents and such teachings are incorporated herein by reference as if fully set forth hereunder.

The tire 10 is seen to comprise a tread portion 12 and a carcass 14. In accordance with the teachings of the aforementioned U.S. patents, a reinforcing filament 16 is wound about the carcass 14.

The means to elevate the lateral beam stiffness of the tread, i.e., stiffness in the plane parallel to the tread surface, is accomplished through the use of a plurality of breaker plies shown generally as 18 and 20. The breaker plies add necessary reinforcement to the tire 10 for protecting the tire from road abuse. The breaker plies 18 and 20 provide rigidity in the horizontal plane of the footprint during application of the forces during turning. The rigidity lessens the squirm of the tread as the tire moves through the turn.

The breakers contain a sufficient population of reinforcing material or cords 24, either metallic or nonmetallic, to elevate the modulus sufficiently to give the tread stiffness. The material 24 can be continuous cords or the like or chopped strands, such material being placed substantially parallel to one another and the continuous cords having an optimum population of 10–16 ends per inch. It is obvious that other end population may be obtained by the use of various diameters of cord, different materials, or by the use of chopped fibers. The breakers 18 and 20 may be formed in any conventional method such as calendering or the like.

Each breaker ply is placed on the green carcass in the final configuration such that the reinforcing material 24 is at an angle $\theta$ with the meridian of the tire. The second breaker is oriented so that the reinforcing material 24 is positioned at the angle $\theta$ but at the opposite direction to the angle of the first breaker. It has been found that if the opposing breakers 18 and 20 are oriented so that the reinforcing material 24 makes an 18°–22° angle with the meridian of the tire, the breakers provide the maximum contribution to lateral beam stiffness of the tire 10. Although the 18°–22° angle is optimum, other angles may be utilized with similar results. As an example, $\theta$ angles of from 10°–25° coact sufficient to form substantially parallelograms between the reinforcing material of each pair of breaker plies.

The radial placement of the breakers in FIGS. 1–2 is seen to be positioned between the radial reinforcing filament 16 and the circumferential reinforcing filament or belt formed by the continuously wrapped circumferential element 22. The circumferential belt 22 is substantially circumferentially inextensible and forms the load carrying member. The circumferential belt 22 has in effect a 0° angle orientation relative to the tire meridian which reduces the ply steer of the bias breaker plies. The circumferential belt 22 also exerts a containing restriction on the breaker plies 18 and 20 which helps the breaker plies to resist the centrifugal forces developed at high speeds. Since the circumferential belt 22 helps to resist the centrifugal forces exerted on the breaker plies 18 and 20 and is positioned in the final configuration of the tire, the breaker plies 18 and 20 are only used for enhanced beam stiffness, and therefore can be very light in weight.

Other configurations and orientation of the breaker plies and circumferential belt are shown in FIGS. 3–11. In each of these instances, the circumferential belt is designated as 26 and the opposed breaker plies are respectively designated 28 and 30. In each example shown in FIGS. 3–7, the circumferential belt 26 is radially outward of the breaker plies such that the benefits described hereinabove are obtained. It is seen in the alternate embodiments illustrated in FIGS. 3–7 that the peripheral edge of the circumferential belt 26 overlies or extends beyond the peripheral edges of the respective breaker plies 28 and 30. In this manner, the circumferential belt 26 provides added support to resist the centrifugal forces exerted on the peripheral edges of the respective breakers.

In the embodiment illustrated in FIG. 8, one breaker ply 28 is positioned radially outward and one breaker ply 30 is positioned radially inward from the circumferential belt 26. In FIG. 9, the breaker plies 28 and 30 are both positioned radially outward from the circumferential belt 26. It may be seen that the widths of the respective breaker plies 28 and 30 and circumferential belt 26 may vary without departing from the inventive concept herein described. The breaker plies of FIGS. 8–9 provide similar tread stiffness and rigidity in the horizontal plane of the footprint as well as tire protection from road abuse.

FIGS. 10–11 illustrate one layer of breaker plies 28 and 30 placed in side-by-side relationship such that a herringbone type configuration of the reinforcing materials 24 exists. Any number of side-by-side plies may be utilized depending on the width of each ply. A second layer of side-by-side plies would be placed radially apart from the first layer to complete the tire construction. The reinforcing material 24 of the second layer of breaker plies would be at the same angle as the reinforcing material 24 of the first layer but in the opposite direction of the ply radially spaced therefrom.

It is seen that the breaker plies in the above examples provide minimal strength in the circumferential direction, the circumferential belt providing the maximum circumferential strength. The lightweight opposed breaker plies are placed on the green carcass and oriented and assembled in their final orientation and placement. In other words, the green carcass is formed in its final tube tire shape as described in the aforementioned Grawey patents. The breaker plies are then placed upon the shaped green carcass such that all reinforcing material is aligned at the angle $\theta$ to the vertical plane of the tire. Also, each of the individual reinforcing members of the breaker ply is at the same angle $\theta$. The carcass is shaped in its final configuration at the time of the breaker ply application so there is no distorting of the reinforcing material angle $\theta$ during curing. There is no required bending or forming of the tire into shape after the breakers have been applied. The breaker plies provide for a stiffer tread due to the uniform orientation of the breaker reinforcing material from side to side. Accordingly, the objectives hereinbefore set forth have been accomplished.

The above-described embodiments have shown the use of two layers of breaker plies. It should be noted that this description is for illustrative purposes only and that any number of breaker ply layers may be used. Further, the breaker ply construction described herein may be utilized in open tube type tires as well as the closed tube type illustratively shown in the drawings.

While present exemplary embodiments of this invention have been illustrated and described, it will be recognized that this invention may be otherwise variously embodied and practiced by those skilled in the art.

What is claimed is:
1. In a pneumatic tube tire manufactured in the final formed condition of a preselected configuration, the combination comprising:
   a carcass portion having a final preselected configuration;
   a tread and sidewall portion forming the exterior of the tire;
   radial reinforcing means wrapped about said carcass portion, said means preventing cross-sectional circumferential expansion of said carcass portion upon pressurization of said carcass portion;
   a plurality of breaker plies, each breaker ply including a multiplicity of substantially aligned reinforcing material disposed therein, said breaker plies being placed radially outward from and in circumferential relationship with said radial reinforcing means and being substantially in vertical alignment with said tread portion, said breaker plies being oriented in the tire in the final formed condition;

said aligned reinforcing material having a uniform placement within said ply and being nondistorted wherein each of said aligned reinforcing materials is disposed along its entire length at substantially the same angle to the vertical plane of the tire;

an elongated cord member defining a circumferential reinforcing belt circumferentially extending around the tire and being radially inward from said tread portion whereby said belt substantially prevents any appreciable convex curvature of the tire when the tire is pressurized, said cord member defining a substantially 0° angle with the meridian of the tire.

2. The combination as set forth in claim 1 in which said breaker plies includes a first and a second breaker ply, said first and second breaker plies being positioned one over the other in a radially outward direction and in which one of said breaker plies is oriented oppositely that of the other of said breaker plies wherein said aligned reinforcing material is at the same angle but in the opposite direction to that of the other breaker ply.

3. The combination as set forth in claim 2 in which said reinforcing material includes elongated reinforcing elements uniformly aligned throughout each of said breaker plies.

4. The combination as set forth in claim 3 in which the angle of said reinforcing elements is between 10°–25° with the meridian of the tire.

5. The combination as set forth in claim 3 in which said first and second breaker plies are positioned intermediate between said radial reinforcing element and said circumferential reinforcing belt.

6. The combination as set forth in claim 3 in which at least one of said breaker plies is spaced radially outward from said circumferential reinforcing belt.

7. The combination as set forth in claim 3 in which said first and second breaker plies each include a layer of side-by-side ply strips wherein the adjacent reinforcing material forms a substantially herringbone pattern.

* * * * *